United States Patent [19]

Matsui et al.

[11] Patent Number: 5,278,903
[45] Date of Patent: Jan. 11, 1994

[54] INFORMATION PROCESSING SYSTEM

[75] Inventors: Tsunehiro Matsui; Yoshihiro Maei; Tadahiko Ikegaya; Takashi Sakayama; Yasuhiro Kamiyama, all of Saitama, Japan

[73] Assignee: Fuji Xerox Co., Ltd., Tokyo, Japan

[21] Appl. No.: 901,248

[22] Filed: Jun. 19, 1992

[30] Foreign Application Priority Data

Jun. 21, 1991 [JP] Japan .................. 3-175918

[51] Int. Cl.$^5$ .................. H04N 1/44; G09C 3/08; H04L 9/00; H04L 15/34
[52] U.S. Cl. .................. 380/18; 380/51; 380/55
[58] Field of Search .................. 380/51, 55, 59, 18

[56] References Cited

U.S. PATENT DOCUMENTS 5,007,084  4/1991  Materna et al. .................. 380/18
5,168,371  12/1992  Takayanagi .................. 380/18

FOREIGN PATENT DOCUMENTS 1-18371  1/1989  Japan .
1-91378  6/1989  Japan .

OTHER PUBLICATIONS

"CCITT, The International Telegraph and Telephone Consultative Committee," Blue Book, vol. VIII, Nov. 14-25, 1988, pp. 238-239.

Primary Examiner—David C. Cain
Attorney, Agent, or Firm—Finnegan, Henderson, Farabow, Garrett & Dunner

[57] ABSTRACT

Disclosed is an information processing system such as a work station, a personal computer system or the like. The information processing system includes an identification information input unit for inputting identification information on manuscript information to be processed, an encoding unit for encoding the manuscript information, a recording unit for recording the encoded manuscript information together with the identification information thereof, a read unit for reading the encoded manuscript information recorded, and a reconstruct unit for reconstructing the encoded manuscript information read.

13 Claims, 5 Drawing Sheets

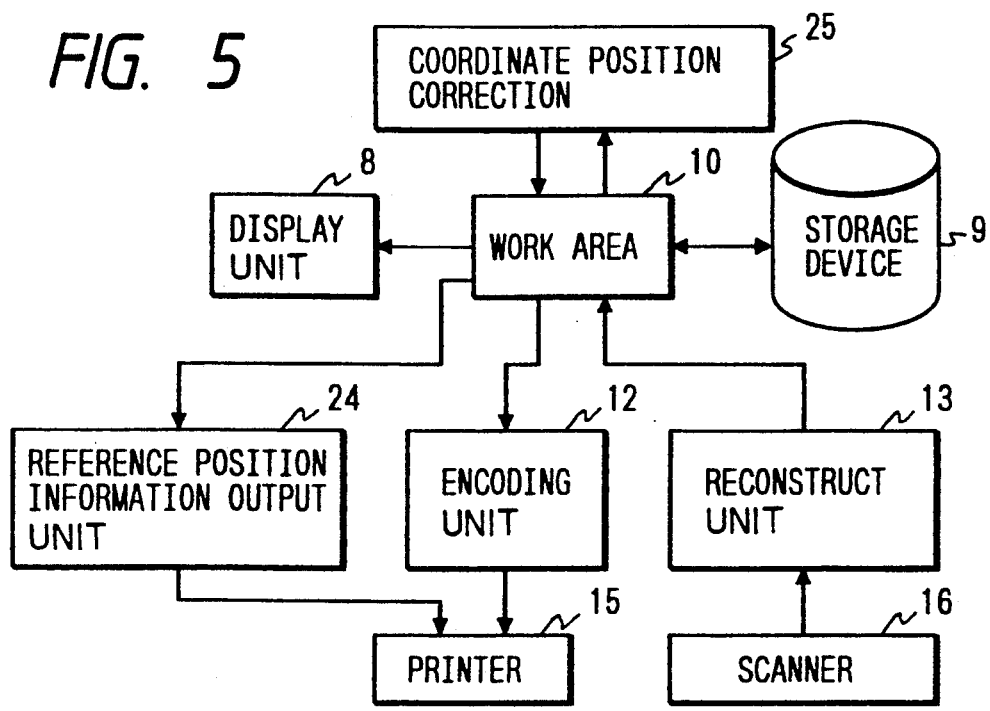
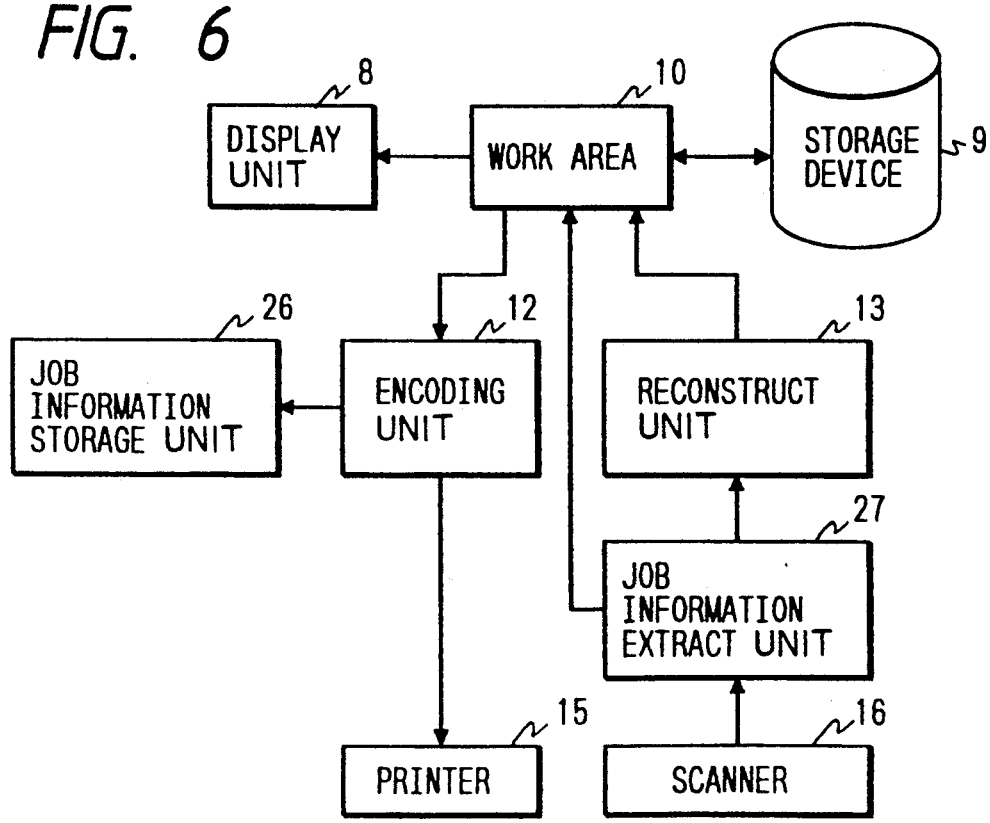

INFORMATION PROCESSING SYSTEM

BACKGROUND OF THE INVENTION

1. Field of the Invention

The present invention relates to an information processing system such as a work station, a personal computer system or the like and, in particular, to an information processing system which has an encoding processing function to encode and output manuscript information and to reconstruct the encoded manuscript information.

2. Description of the Related Art

In recent years, there has been widely used an information processing system such as a work station, a personal computer system or the like, and various kinds of information exchanges have been made by means of a network. It is possible to transfer manuscript information between work stations provided in the network. Also, manuscript information made up at a work station can be displayed and proofread on the screen of another work station, and the thus proofread manuscript information can be printed.

Also, a data base is connected to the network and data stored in the data base can be read out from the respective work stations freely or under a given condition.

The manuscript that has been transferred from a work station or the information that has been read out from the data base must be kept secret in some cases and thus, when the manuscript or information is printed and possessed, sufficient care must be given in keeping it.

As an information processing system which relates to such secret keeping, for example, in Japanese Utility Model Unexamined Publication No. Hei. 1-91378, there has been proposed an information processing system having an encoding processing function, in which, when the remaining amount of memory of a facsimile device decreases, manuscript information stored in an image memory is encoded and printed out to thereby secure the capacity of the image memory, after that at a time when the image memory has a sufficient capacity, the printed-out manuscript is set in a read device by an operator, and the encoded image information is then read and reconstructed.

However, when possessing the secret information, conventionally, the management of the secret information is entrusted to an operator, which makes it difficult to keep the secret information in a sure manner. Also, when possessing the encoded secret information, there arise the following problems:

(1) The encoded manuscript is difficult to manage because the content thereof cannot be deciphered. Also, since the encoded and recorded manuscript cannot be understood by a third person, there is a possibility that the encoded and recorded manuscript may be torn to pieces or thrown away.

(2) The encoded manuscript can be reconstructed by any person if it is read again by use of the exclusive device and, therefore, it is difficult to keep the encoded manuscript in secret.

(3) Position shift will occur when the encoded image information is printed out on recording paper and when the recording paper is read again, so that the image information finally obtained will be shifted in position.

(4) Only one encoding system is registered and thus it is relatively easy to decipher the information encoded in this system.

SUMMARY OF THE INVENTION

The present invention is directed toward eliminating the above problems found in the conventional system. Accordingly, it is an object of the invention to provide an information processing system that allows a sure management of secret information and is improved in operationability and convenience.

In order to attain the above object, the present invention provides an information processing system including identification information input means for inputting identification information on manuscript information to be processed, encoding means for encoding the manuscript information, recording means for recording the encoded manuscript information together with the identification information thereof, read means for reading the encoded manuscript information recorded, and reconstruct means for reconstructing the encoded manuscript information read.

BRIEF DESCRIPTION OF THE DRAWINGS

FIG. 5 is a functional block diagram showing a fifth embodiment of the information processing system according to the invention;

FIG. 6 is a functional block diagram showing a sixth embodiment of the information processing system according to the invention;

DETAILED DESCRIPTION OF THE PREFERRED EMBODIMENTS

Description will hereunder be given in detail of the embodiments of an information processing system according to the invention with reference to the accompanying drawings. While the present invention includes all elements that the conventional information processing system includes, in this specification there are illustrated only the elements necessary for explanation of the invention.

Figure 1:
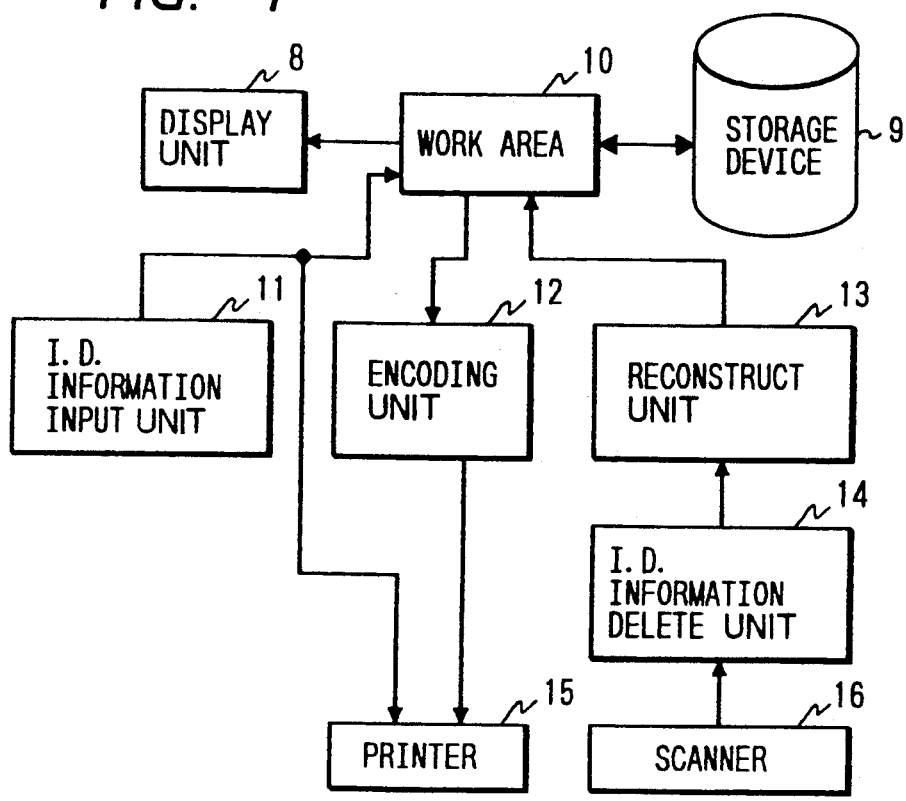
FIG. 1 is a functional block diagram showing a first embodiment of an information processing system according to the invention.

Referring now to FIG. 1, there is shown a functional block diagram of a first embodiment of an information processing system according to the invention.

A work area 10 is used to store temporarily manuscript information to be processed. In the work area 10, there are stored the manuscript information that is transmitted through a network from other information processing systems and the manuscript information that is being created and proofread by operating the terminals of its own. Manuscript information on the work area 10 is displayed on display unit 8 and thus an operator, while referring to the display screen of the display unit 8, executes proper processings such as amendment, addition, proofreading and the like on the manuscript information.

From identification information input unit 11, as identification information relating to the manuscript information within the work area 10, there are input the received date and time as well as created date and time of the manuscript information, the title of the manuscript information and the name of the creator, and the like. The manuscript information that has been processed in the work area 10 is then stored in a storage device 9. In the storage device 9, the identification information input from the identification information input units 11 is also stored together with the manuscript information.

Encoding units 12, in accordance with an instruction from the operator, encodes the manuscript information within the work area 10 and outputs the encoded manuscript information to a printer 15. The printer 15 prints the encoded manuscript information and the identification information thereof on recording paper.

A scanner 16 reads the encoded manuscript information and identification information on the recording paper and outputs the same to identification information delete units 14. The identification information delete unit 14 deletes the identification information out of the encoded manuscript information and identification information read by the scanner 16 and outputs only the encoded manuscript information selectively to reconstruct unit 13. The reconstruct means 13 reconstructs the encoded manuscript information and stores it in the work area 10.

Figure 8A:
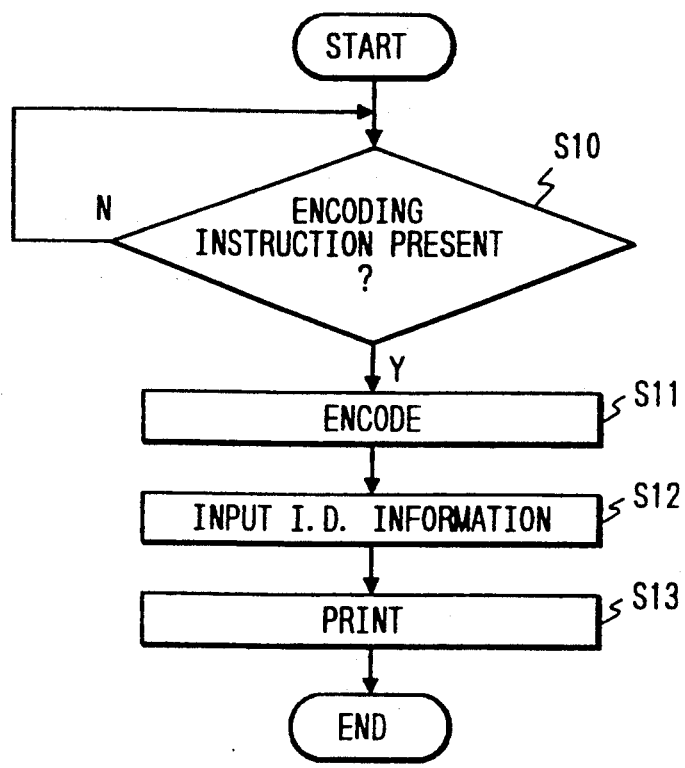
FIGS. 8(a) and 8(b) are flow charts for explaining the operation of the first embodiment of the invention.

Now, description will be given below of the operation of the first embodiment shown in FIG. 1 with reference to flow charts shown in FIGS. 8(a) and 8(b). Here, FIG. 8(a) relates to an encoding processing, while FIG. 8(b) relates to a reconstructing processing.

When encoding and printing the manuscript information being processed, if the operator gives an encoding instruction, then in Step S10 the encoding instruction is detected, while in Step S11 the manuscript information in the work area 10 is encoded by the encoding unit 12. In Step S12, as the identification information on the manuscript information, the date, title, name of the creator and the like of the manuscript information are input from the identification information input unit 11. In Step S13, the encoded manuscript information together with the identification information thereon is printed out on the recording paper.

Figure 8B:
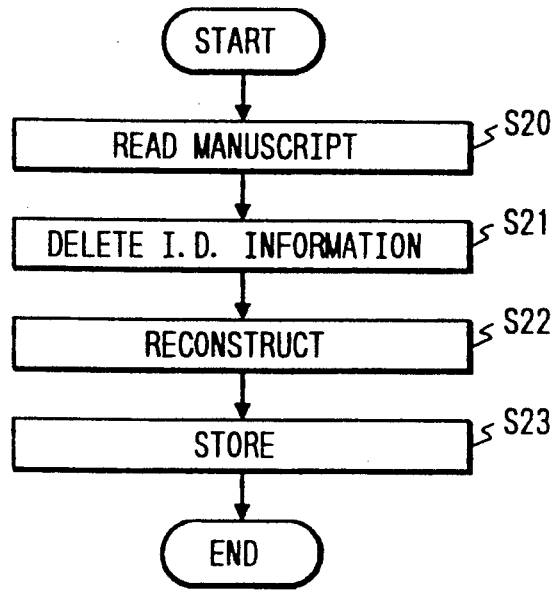

Also, when reconstructing the encoded manuscript information, in FIG. 8(b), if a manuscript with the encoded manuscript information and identification information thereof recorded therein is set in the scanner 16, then the manuscript is read by the scanner 16 in Step S20. In Step S21, only the identification information out of the information read is deleted by the identification information delete unit 14, then in Step S22 only the encoded manuscript information is reconstructed by the reconstruct unit 13, and in Step S23 the manuscript information reconstructed is stored in the work area 10.

According to the first embodiment, since the encoded manuscript information is output together with the identification information thereof, reference to the identification information makes it possible to classify and identify the manuscript. This facilitates the management of the encoded manuscript information and thus prevents the encoded manuscript information from being used for a wrong purpose.

Figure 2:
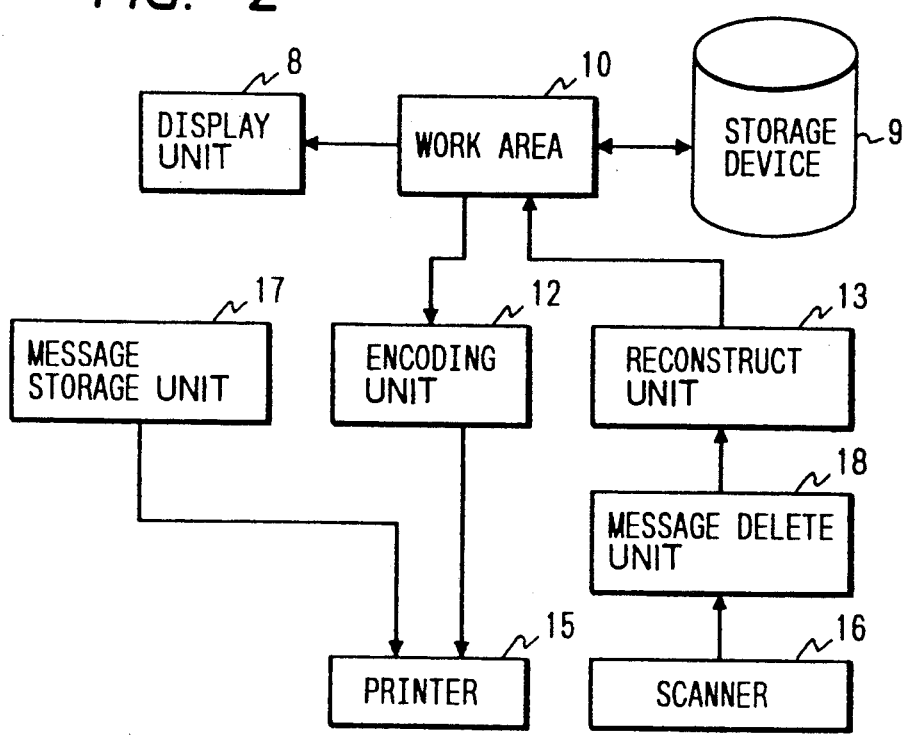
FIG. 2 is a functional block diagram showing a second embodiment of the information processing system according to the invention.

Referring now to FIG. 2, there is shown a functional block diagram of a second embodiment of the information processing system according to the invention, in which the same reference characters designate the same or equivalent parts used in the above-mentioned first embodiment.

In FIG. 2, in message storage unit 17, there is previously stored a message which is printed at the same time when the encoded manuscript information is printed on recording paper and which tells that the manuscript is a manuscript having encoded manuscript information recorded therein. The message has a content to the effect that encoded information is recorded in this manuscript, for example. Message delete unit 18 deletes the message out of the encoded manuscript information and message read by the scanner 16 and thus selectively outputs only the encoded manuscript information to the reconstruct unit 13.

In the above-mentioned structure, if the manuscript information is encoded in accordance with an instruction from the operator, then the encoded manuscript information is printed on recording paper together with the message. Also, if the manuscript having the encoded manuscript information and the message recorded therein is read by the scanner 16, then the message is deleted by the message delete unit 18 and thus only the encoded manuscript information is selectively reconstructed by the reconstruct unit 13 and is then stored in the work area 10.

According to the second embodiment of the invention, due to the fact that the encoded manuscript information is printed out together with the message to the effect that the manuscript information is an encoded one, even a third person can recognize that the manuscript is an encoded one, so that the waste or loss of the manuscript can be prevented.

Figure 3:
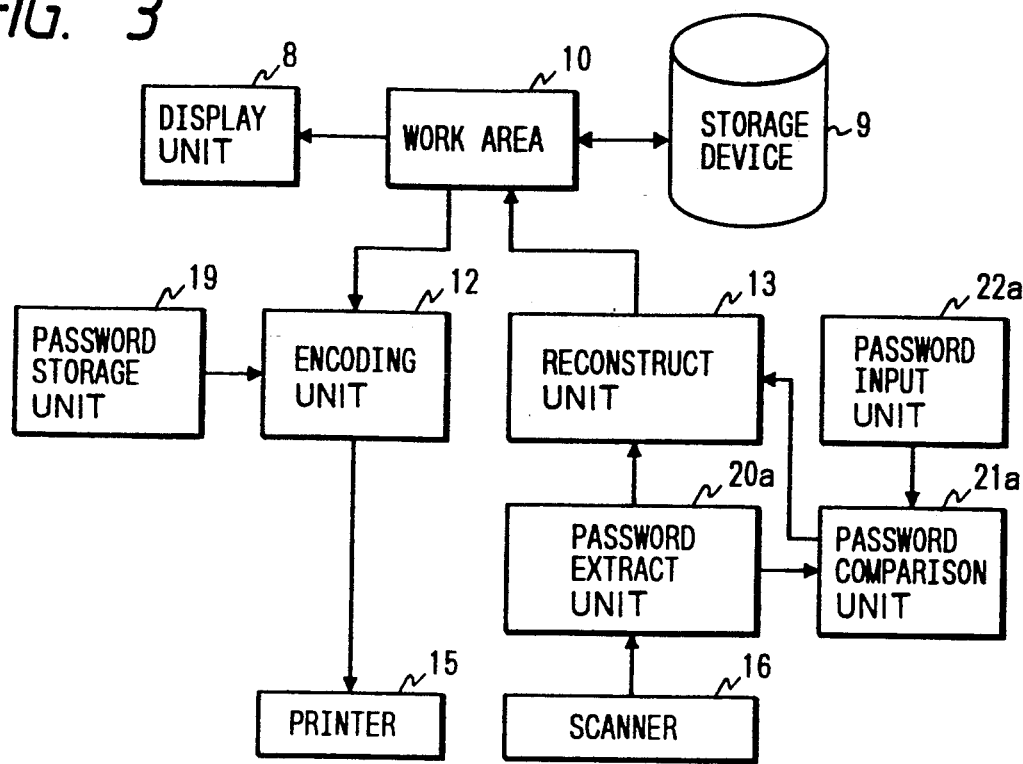
FIG. 3 is a functional block diagram showing a third embodiment of the information processing system according to the invention.

Now, in FIG. 3, there is shown a functional block diagram of a third embodiment of the information processing system according to the invention, in which the same reference characters designate the same or equivalent parts that have been illustrated in the above-mentioned first and second embodiments.

In FIG. 3, in password storage unit 19, there is stored a password unique to the present information processing system (which is hereinafter referred to as a terminal password). Password extract unit 20a extracts and reconstructs the encoded terminal password printed on the recording paper together with the encoded manuscript information, outputs the extracted terminal password to password comparison unit 21a, and selectively outputs only the encoded manuscript information to the reconstruct unit 13.

From password input unit 22a, there is input a password by the operator. The password comparison unit 21a compares the extracted terminal password with the password input by the operator, and outputs the comparison results to the reconstruct unit 13.

In this structure, if the manuscript information within the work area 10 and the terminal password stored in the password storage unit 19 are encoded by the encoding unit 12 in accordance with an instruction from the operator, then the printer 15 prints the encoded manuscript information and the encoded terminal password on recording paper.

Also, if the manuscript with the encoded manuscript information and encoded terminal password recorded thereon are read by the scanner 16, then the encoded terminal password is extracted and reconstructed by the password extract unit 20a and is then output to the password comparison unit 21a.

Here, if the operator inputs the password from the password input unit 22a, then the password comparison means 21a compares the input password with the extracted and reconstructed terminal password. If the two passwords coincide with each other, then the password comparison unit 21a permits the reconstruct unit 13 to reconstruct the encoded manuscript information and, if not, then prohibits the unit 21a from reconstructing the encoded manuscript information. If reconstruction is permitted, then the reconstruct unit 13 reconstructs the encoded manuscript information output from the password extract unit 20a and stores the reconstructed manuscript information in the work area 10.

According to the third embodiment of the invention, only when the terminal password unique to the present information processing system coincides with the password input by the operator, then the encoded manuscript information can be reconstructed, so that a high degree of secret keeping is possible.

Figure 4:
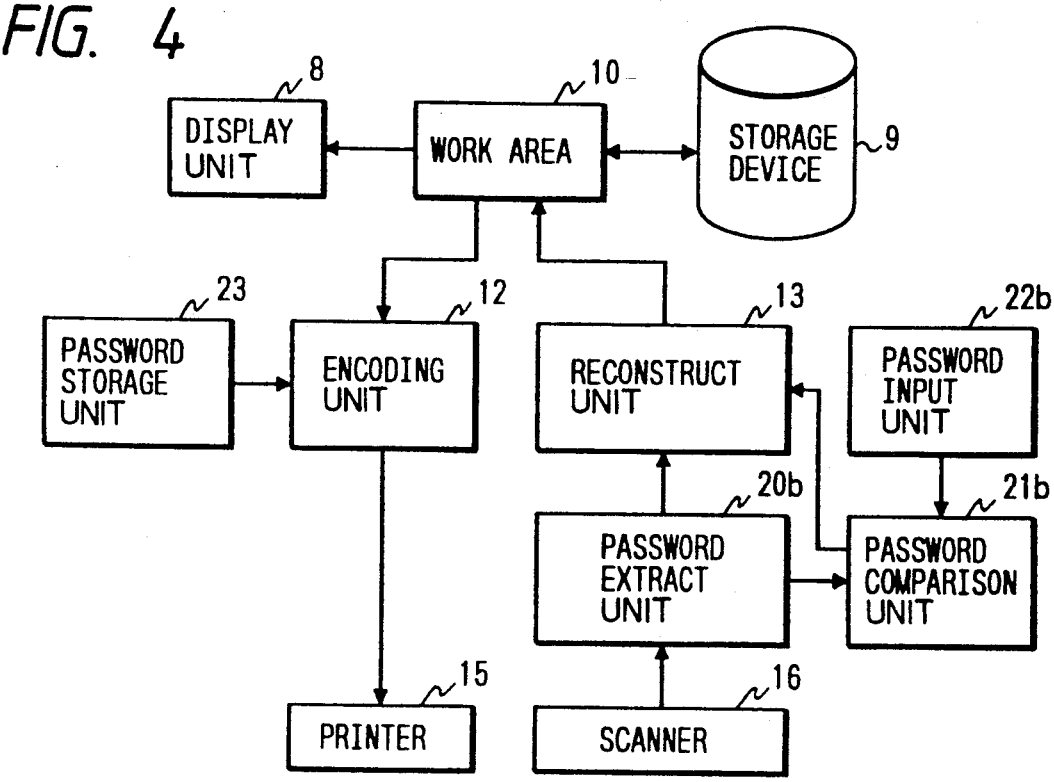
FIG. 4 is a functional block diagram showing a fourth embodiment of the information processing system according to the invention.

Referring now to FIG. 4, there is shown a functional block diagram of a fourth embodiment of the information processing system according to the invention, in which the same reference characters designate the same or equivalent parts that have been illustrated in the first, second and third embodiments of the invention.

In FIG. 4, password storage unit 23 stores, for example, a password unique to each manuscript information (which is hereinafter referred to as a communication password) transmitted together with the manuscript information from a communication partner station.

In this structure, manuscript information transmitted from another information processing system is stored in the work area 10, and a communication password and the like accompanying the manuscript information is stored in the password storage unit 23.

If the operator instructs encoding, then the manuscript information in the work area 10 and the communication password stored in the password storage unit 23 are output to the encoding unit 12. When the encoding unit 12 encodes and outputs the manuscript information and communication password, then the encoded manuscript information as well as the encoded communication password are printed on the recording paper by the printer 15.

Also, if the manuscript with the encoded manuscript information and the encoded communication password recorded thereon is read by the scanner 16, then the encoded communication password is extracted and reconstructed by the password extract unit 20b, and the reconstructed communication password is then output to the password comparison unit 21b.

Here, if the operator inputs a password from the password input unit 22b, then the password comparison unit 21b compares the input password with the extracted and reconstructed communication password and, if the two passwords coincide with each other, then permits the reconstruct unit 13 to reconstruct the encoded manuscript information and, if not, prohibits the reconstruct unit 13 from reconstructing the encoded manuscript information. If reconstruction is permitted, then the reconstruct unit 13 reconstructs the encoded manuscript information output from the password extract unit 20b and stores the reconstructed manuscript information in the work area 10.

According to the fourth embodiment of the invention, only when the password unique to the manuscript information coincides with the password input by the operator, then the encoded manuscript information can be reconstructed, so that a high degree of secret keeping is possible.

Also, in the above-mentioned embodiment, the description has been given on the assumption that a password unique to each manuscript information is used. However, the present invention is not limited to this, but alternatively, there can be used a password which is unique to the communicating partner system.

Further, in the above-mentioned third and fourth embodiments of the invention, the description has been given to the effect that the password extract unit 20a (20b) extracts and reconstructs the encoded password and then outputs the reconstructed password. However, according to the invention, alternatively, at first, the reconstruct unit 13 may reconstruct the encoded manuscript information and the encoded password and, after that, the password extract unit 20a (20b) may extract the reconstructed password and then output this password to the password comparison unit 21 (21b).

Referring now to FIG. 5, there is shown a functional block view of a fifth embodiment of the information processing system according to the invention, in which the same reference characters designate the same or equivalent parts illustrated in the previous embodiments of the invention.

In FIG. 5, reference position information output unit 24 outputs reference position information in response to a readout timing in a predetermined region in the work area 10. Coordinate position correction unit 25 corrects the coordinate position of manuscript information in the work area 10 in accordance with the coordinate position of the reference position information in the work area 10.

In the above-mentioned structure, if the operator instructs encoding, then the manuscript information in the work area 10 is output to the encoding unit 12. When the encoding unit 12 encodes and outputs the manuscript information, then the printer 15 prints out the encoded manuscript information and the reference position information output from the reference position information output unit 24 on the recording paper.

Figure 9:
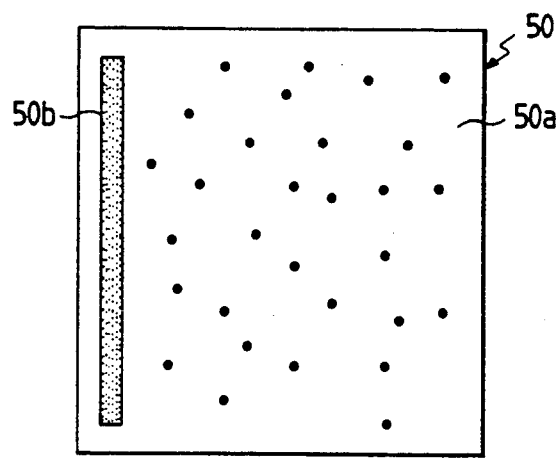
FIG. 9 is a view for explaining the function of the fifth embodiment of the invention.

FIG. 9 is a view showing an example of a manuscript 50 on which the encoded manuscript information and the reference position information are printed. In this embodiment, line-shaped reference position information 50b is recorded in the left-end portion of encoded manuscript information 50a.

Also, if the manuscript 50 with the encoded manuscript information and the reference position information recorded thereon are read by the scanner 16, then the reconstruct unit 13 reconstructs only the encoded manuscript information 50a and stores the reconstructed manuscript information 50a together with the reference position information 50b in the predetermined region of the work area 10. The coordinate position correction unit 25 detect the coordinate position of the reference position information 50b in the work area 10 and, in accordance with the results, corrects the coordinate position of the manuscript information stored.

According to the fifth embodiment of the invention, due to the fact that a relative position between the reference position information and the manuscript information is kept constant, if the coordinate position of the manuscript information is corrected according to the coordinate position of the reference position information within the work area 10, then the manuscript information can be stored in a proper coordinate position. For this reason, the manuscript information on a display screen can be prevented from shifting in position.

Referring now to FIG. 6, there is shown a functional block diagram of a sixth embodiment of the information processing system according to the invention, in which the same reference characters designate the same or equivalent parts illustrated in the previous embodiments of the invention.

In FIG. 6, job information storage unit 26 stores job information on manuscript information in such a manner that the job information is made to correspond to its manuscript information. The term "job information" is used here to represent the kind or attribute of the manuscript information or the processing method thereof.

Job information extract unit 27 extracts encoded job information printed together with encoded manuscript information on the recording paper and, in accordance with the extracted job information, stores reconstructed manuscript information together with information representing the kind and attribute of the manuscript information in the proper region of the work area 10 or the storage device 9.

In the above-mentioned structure, the manuscript information in the work area 10 and the job information corresponding to the manuscript information are encoded by the encoding unit 12, and the encoded manuscript information and the encoded job information are printed on the recording paper.

Also, if the manuscript with the encoded manuscript information and the encoded job information recorded therein is read by the scanner 16, then only the encoded job information of the thus read information is extracted by the job information extract unit 27, while only the encoded manuscript information is reconstructed by the reconstruct unit 13. In accordance with the extracted job information, the reconstructed manuscript information is stored in the work area 10 or storage device 9 in a proper manner so that the manuscript information can be processed properly.

According to the sixth embodiment of the invention, the encoded manuscript information is printed together with its job information and, if the manuscript relating to the encoded manuscript information is read by the scanner, then the manuscript information is stored in the work area 10 in a proper manner in accordance with the job information so that the manuscript information can be processed properly. Thus, the manuscript information can be processed properly without troubling the operator.

Figure 7:
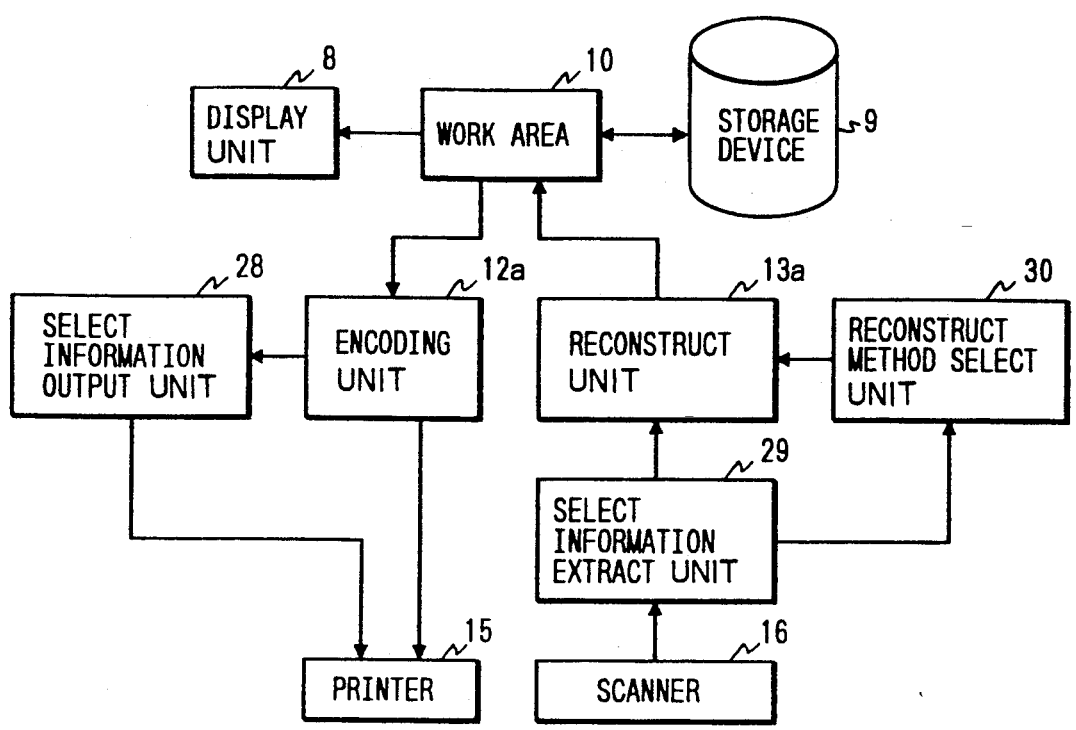
FIG. 7 is a functional block diagram showing a seventh embodiment of the information processing system according to the invention.

Referring now to FIG. 7, there is shown a functional block diagram of a seventh embodiment of the information processing system according to the invention, in which the same reference characters designate the same or equivalent parts illustrated in the previous embodiments of the invention.

In FIG. 7, encoding unit 12a employs a plurality of different encoding methods and encodes manuscript information in the work area 10 by use of one of the encoding methods. Reconstruct unit 13a employs a plurality of reconstructing methods respectively corresponding to the plurality of encoding methods and reconstructs the encoded manuscript information by use of one of the reconstructing methods corresponding to the encoding method employed by the encoding unit 12a.

Select information output unit 28 outputs select information indicating the encoding method executed by the encoding unit 12a. Select information extract unit 29 extracts the select information printed together with the encoded manuscript information on the recording paper. Reconstruct method select unit 30 selects the reconstruct method executed by the reconstruct unit 13a in accordance with the select information extracted.

In the above-mentioned structure, if the manuscript information stored in the work area 10 is encoded by the encoding unit 12a, then the select information output unit 28 outputs the select information that indicates the encoding method executed, and the encoded manuscript information and the select information are printed on the recording paper.

Also, when a manuscript with the encoded manuscript information and select information recorded thereon is read by the scanner 16, then the select information is extracted by the select information extract unit 29, the extracted select information is output to the reconstruct method select unit 30, while only the encoded manuscript information is output to the reconstruct unit 13a. The reconstruct method select unit 30, in accordance with the select information, decides the encoding method executed by the encoding unit 12a and selects a reconstruct method which corresponds to the encoding method executed. The reconstruct unit 13a reconstructs the encoded manuscript information in the reconstruct method selected by the reconstruct method select unit 30.

According to the seventh embodiment of the invention, encoding is executed by using one of a plurality of different encoding methods, so that a high degree of secret keeping is possible. Also, the selected encoding method is given by the select information and, in the reconstruction of the encoded manuscript information, the reconstruct method corresponding to the encoding method is selected automatically on the basis of the select information, so that a complicated operator's operation can be prevented.

In addition, for encoding in the above-mentioned first through seventh embodiments of the invention, an encoding method by scramble and discramble process as set forth in "CCITT, V Series Advice, V29 Appendix II" may be employed. Also, a compressing method for communication such as MH method, MR method, or MMR method may be employed.

In the above-mentioned first, second, third, fourth and seventh embodiments of the invention, the description has been given on the assumption that the manuscript information reconstructed by the reconstruct unit 13 (13a) is all stored once in the work area. However, the invention is not limited to this but, alternatively, the manuscript information reconstructed may be printed directly by the printer 15.

Also, in the above-mentioned respective embodiments of the invention, the description has been given on the assumption that the manuscript information on the work area 10 is encoded. However, the invention is not limited to this but, alternatively, a desired file may be selected out of a large number of files stored in the storage device 9, the desired file selected may be encoded, and the encoded file may be output.

Further, in the above-mentioned first through seventh embodiments of the invention, the description has been given on the assumption that there is stored unencoded manuscript information in the storage device 9. However, the invention is not limited to this but, alternatively, there may be stored encoded manuscript information in the storage device 9 and the encoded manuscript information stored may be read out to the work area 10 or may be reconstructed when it is recorded by the printer 15. In this case, the manuscript information is stored in an encoded state and, therefore, a further higher degree of secrecy can be obtained.

As can be understood clearly from the foregoing description, according to the preferred embodiments of the present invention, due to the fact that the manuscript information processed in the information processing system is encoded before it is output, it is possible to manage secret information surely in the information processing system.

Also, due to the fact that the encoded manuscript information is recorded on the recording paper together with various kinds of information and various kinds of control are executed according to the recorded information, the information processing system is improved in its operationability and convenience.

What is claimed is:

1. An information processing system comprising:
   means for inputting identification information on manuscript information;
   encoding means for encoding said manuscript information into a cryptographic format;
   recording means for recording the cryptographic format and the identification information onto a substrate;
   means for reading the cryptographic format from the substrate; and
   means, responsive to the reading means, for decoding the cryptographic format.

2. An information processing system comprising:
   encoding means for encoding manuscript information into a cryptographic format;
   means for storing a message to indicate that said manuscript information is encoded manuscript information;
   recording means for recording the cryptographic format and said message onto a substrate;
   means for reading the cryptographic format from the substrate; and
   means, responsive to the reading means, for decoding the cryptographic format.

3. An information processing system comprising:
   means for storing a first password;
   encoding means for encoding manuscript information and said first password into a cryptographic format;
   recording means for recording the cryptographic format of the manuscript information and of said first password onto a substrate;
   means for reading the cryptographic format of the manuscript information and of said first password from the substrate to provide a read cryptographic format of the manuscript information and of the first password;
   means for inputting a second password;
   means for comparing said read first password with said second password, to determine whether said read first password and said second password are coincident; and
   means for decoding the read cryptographic format of the manuscript information when said read first password and said second password are coincident.

4. An information processing system comprising:
   password storage means for storing a first password corresponding to manuscript information;
   encoding means for encoding said manuscript information and an identification sign thereof into a cryptographic format;
   means for recording the cryptographic format of the manuscript information and of said first password onto a substrate encoded first password;
   means for reading the cryptographic format of the manuscript information and of said first password from the substrate to provide a read cryptographic format of the manuscript information and of the first password;
   means for inputting a second password;
   means for comparing said read first password with said second password, to determine whether said read first password and said second password are coincident; and
   means for decoding the read cryptographic format of the manuscript information when the read first password and said second password are coincident.

5. An information processing system comprising:
   a work area;
   encoding means for encoding manuscript information into a cryptographic format;
   reference position information output means for outputting reference position information;
   recording means for recording the cryptographic format and said reference position information onto a substrate;
   means for reading the cryptographic format and said reference position information from the substrate to provide a read cryptographic format of the manuscript information and of the first password;
   means for decoding the read cryptographic format and for storing the decoded manuscript information and said reference position information in said work area; and
   means for correcting a storage position of said decoded manuscript information in said work area in accordance with said stored reference position information.

6. An information processing system comprising:
   means for storing job information;
   encoding means for encoding said manuscript information and the job information into a cryptographic format;
   recording means for recording the cryptographic format of the manuscript information and of the job information onto a substrate;
   means for reading the cryptographic format of the manuscript information and the job information from the substrate to provide a read cryptographic format of the manuscript information and of the first password;
   means, responsive to the reading means, for decoding the cryptographic format; and
   means for processing said decoded manuscript information in accordance with said read job information.

7. An information processing system comprising:
   encoding means for encoding manuscript information into a cryptographic format using a selected one of a plurality of different encoding methods;
   means for outputting select information indicating said selected encoding method;

recording means for recording the cryptographic format and said select information onto a substrate;

means for reading the cryptographic format and the select information from the substrate; and means, responsive to the reading means, for decoding the cryptographic format by selecting a decoding method in accordance with the select information.

8. The information processing system according to any one of claims 1 to 7, further comprising a storage means for storing multiple pieces of manuscript information in every file, said manuscript information being stored in said storage means in an encoded state.

9. An information processing method comprising the steps of:

encoding manuscript information into a cryptographic format;

recording the cryptographic format and identification information onto a substrate;

reading the cryptographic format from the substrate; and decoding the cryptographic format read by said reading step.

10. An information processing method comprising the steps of:

encoding manuscript information and a first password into a cryptographic format;

recording the cryptographic format of the manuscript information and of the first password onto a substrate;

reading the cryptographic format of the manuscript information and of the first password from the substrate;

comparing the first password read by said reading step with a second password, to determine whether the read first password and the second password are coincident; and decoding the read cryptographic format of the manuscript information.

11. An information processing method comprising the steps of:

encoding manuscript information into a cryptographic format;

recording the cryptographic format and reference position information onto a substrate;

reading the cryptographic format and the reference position information from the substrate;

decoding the cryptographic format read by said reading step; and processing the read cryptographic format in accordance with the read reference position information.

12. An information processing method comprising the steps of:

encoding manuscript information into a cryptographic format;

recording the cryptographic format of the manuscript information and the job information onto a substrate;

reading the cryptographic format and the job information from the substrate;

decoding the cryptographic format read by said reading step to produce decoded manuscript information; and processing the decoded manuscript information in accordance with the read job information.

13. An information processing method comprising the steps of:

encoding manuscript information into a cryptographic format using a selected one of a plurality of different encoding methods;

generating select information indicating the selected encoding method;

recording the cryptographic format and the select information onto a substrate;

reading the cryptographic format and the select information from the substrate; and decoding the cryptographic format read by said reading step, by selecting a decoding method in accordance with the select information.

* * * * *